United States Patent
Zhan

(10) Patent No.: US 10,496,869 B2
(45) Date of Patent: Dec. 3, 2019

(54) FINGERPRINT DETECTION CIRCUIT AND FINGERPRINT RECOGNITION SYSTEM

(71) Applicant: Shenzhen Goodix Technology Co., Ltd., Shenzhen, Guangdong (CN)

(72) Inventor: Chang Zhan, Guangdong (CN)

(73) Assignee: Shenzhen Goodix Technology Co., Ltd., Shenzhen, Guangdong (CN)

( * ) Notice: Subject to any disclaimer, the term of this patent is extended or adjusted under 35 U.S.C. 154(b) by 134 days.

(21) Appl. No.: 15/658,415

(22) Filed: Jul. 25, 2017

(65) Prior Publication Data

US 2017/0323147 A1 Nov. 9, 2017

Related U.S. Application Data

(63) Continuation of application No. PCT/CN2015/094639, filed on Nov. 16, 2015.

(30) Foreign Application Priority Data

Jul. 24, 2015 (CN) .......................... 2015 1 0444445

(51) Int. Cl.
G06K 9/28 (2006.01)
G06K 9/00 (2006.01)
G06F 3/044 (2006.01)

(52) U.S. Cl.
CPC ......... *G06K 9/00087* (2013.01); *G06F 3/044* (2013.01); *G06K 9/00* (2013.01); *G06K 9/0002* (2013.01)

(58) Field of Classification Search
CPC ............ G06K 9/0002; G06K 9/00006–9/0012
See application file for complete search history.

(56) References Cited

U.S. PATENT DOCUMENTS 6,681,033 B1 1/2004 Yano
7,755,369 B2 7/2010 Chuang
(Continued)

FOREIGN PATENT DOCUMENTS

CN 1564189 A 1/2005
CN 1564189 A 1/2005
(Continued)

OTHER PUBLICATIONS

Ardizzoni, "Efficiently Design an Op-Amp Summer Circuit", ElectronicDesign, https://www.electronicdesign.com/ideas-design/efficiently-design-op-amp-summer-circuit, Aug. 26, 2013, pp. 1-9. (Year: 2013).*

(Continued)

Primary Examiner — Brian Werner
(74) Attorney, Agent, or Firm — Winston Hsu

(57) ABSTRACT

The present invention provides a fingerprint detecting circuit applied in a fingerprint identification system, wherein the fingerprint identification system transmits a first signal to finger. The fingerprint detecting circuit includes a conductive layer to couple a touch from the finger; and an amplifier including a first input terminal coupled to the conductive layer; a second input terminal to receive a second signal; and an output terminal, wherein a first capacitance is between the output terminal and the first input terminal; wherein a phase of the first signal is inverse to a phase of the second signal. The present invention utilizes the two signals with the inverse phases to drive the fingerprint detecting circuit, so as to enhance strength of the output signal and lower hardness of fingerprint detecting. Power consumption and production cost are reduced, and the requirement of conventional voltage for the portable electronic device is satisfied.

16 Claims, 2 Drawing Sheets

(56) References Cited

U.S. PATENT DOCUMENTS

| | | | | |
|---|---|---|---|---|
| 2008/0069413 A1* | 3/2008 | Riedijk | ............... | G06K 9/0002 |
| | | | | 382/124 |
| 2009/0123039 A1* | 5/2009 | Gozzini | ............... | G06K 9/0002 |
| | | | | 382/124 |
| 2016/0358003 A1* | 12/2016 | Shen | ..................... | G06K 9/0002 |
| 2018/0300521 A1* | 10/2018 | Kim | ..................... | G06K 9/0002 |

FOREIGN PATENT DOCUMENTS

| | | |
|---|---|---|
| CN | 101755219 A | 6/2010 |
| CN | 102893248 A | 1/2013 |
| CN | 103563250 A | 2/2014 |
| CN | 103684408 A | 3/2014 |
| CN | 203480479 U | 3/2014 |
| CN | 103902971 A | 7/2014 |
| CN | 104217193 A | 12/2014 |
| CN | 104331202 A | 2/2015 |
| CN | 105138957 A | 12/2015 |
| CN | 103427771 B | 4/2016 |
| JP | 2008-502989 A | 1/2008 |
| WO | 03049011 A1 | 6/2003 |

OTHER PUBLICATIONS

"Chapter 10 Integrated Operational Amplification Circuit", "Electrical and Electronic Technology", edited by Liu Yaoyuan, Beijing University of Technology Press, pp. 181-186, Sep. 2006.

* cited by examiner

FINGERPRINT DETECTION CIRCUIT AND FINGERPRINT RECOGNITION SYSTEM

CROSS REFERENCE TO RELATED APPLICATIONS

The present application is a continuation of international application No. PCT/CN2015/094639, filed on Nov. 16, 2015, which claims the priority to Chinese Patent Application No. 201510444445.3, filed with the Chinese Patent Office on Jul. 24, 2015, both of which are incorporated herein by reference in its entirety.

BACKGROUND OF THE INVENTION

1. Field of the Invention

The present invention, belonging to a field of fingerprint detecting technology, relates to a fingerprint detecting circuit and a fingerprint identification system, and more particularly, to a fingerprint detecting circuit and a fingerprint identification system enhancing an output signal.

2. Description of the Prior Art

With the development of technology, mobile phones, digital cameras, tablet PCs, notebook computers and other portable electronic devices become more and more popular. The portable electronic devices are intended for personal use, with certain privacy. The information stored in the portable device such as phonebook, photos, personal information, etc., are privately owned. If the electronic device is lost, these data may be accessed by other people, causing unnecessary loss. Even though there are several ways using password to protect the electronic device from being used by the other people, the password may be easily to be spread or cracked, which lowers the security. Moreover, the user needs to remember the password so as to use electronic devices. If the user forgets the password, troubles would be brought to the user. Hence, personal fingerprint identification is utilized to achieve the purpose of personal identification, for enhancing the data security.

A capacitive fingerprint identification system is a popular way for implementing a fingerprint identification method, which is to sense a capacitance variation to determine a finger ridge or a finger valley of a user's finger. Specifically, the capacitive fingerprint identification system utilizes a metal electrode to couple a touch from a user, and the fingerprint detecting circuit therein may transform a capacitance between the metal electrode and the finger into a voltage signal and output the voltage signal to a backend fingerprint determining module, such that fingerprint identification is performed. However, the metal electrode is usually covered by a cover plate with a small dielectric constant, the capacitance between the metal electrode and the user finger is extremely small (which is about tens of femto-farad (fF)). Hence, a voltage amplitude of the output signal which the fingerprint detecting circuit outputs to the fingerprint determining module is small as well, and difficulty of fingerprint identification is increased.

In the prior art, a voltage amplitude of a driving signal is raised to solve the small output signal problem. For example, US patent No. US20130271422 A1 provides a driving signal with 12 volts (V) or even 16V to drive the fingerprint detecting circuit. Voltage specification with such high voltage amplitude not only violates requirement of conventional voltage for the portable electronic device (which is 3V or 5V), but also raises circuit complexity and overall power consumption.

SUMMARY OF THE INVENTION

It is therefore a primary objective of the present invention to provide a fingerprint detecting circuit and a fingerprint identification system enhancing a output signal of the fingerprint detecting circuit, which is to enhance a strength of the output signal of the fingerprint detecting circuit and meet the requirement of conventional voltage for the portable electronic device.

The present invention is implemented as follows: a fingerprint detecting circuit applied in a fingerprint identification system, wherein the fingerprint identification system transmits a first signal to a finger. The fingerprint detecting circuit comprises:
a conductive layer, configured to couple a touch from the finger; and
an amplifier, comprising:
a first input terminal, coupled to the conductive layer;
a second input terminal, configured to receive a second signal; and
an output terminal, wherein a first capacitance is formed between the output terminal and the first input terminal;
wherein a first phase of the first signal is inverse to a second phase of the second signal.

The object of the present invention is also to provide a fingerprint identification system, which transmits a first signal to a finger. The fingerprint identification system comprises a plurality of fingerprint detecting circuits, each fingerprint detecting circuit comprises:
a conductive layer, configured to couple a touch from the finger; and
an amplifier, comprising:
a first input terminal, coupled to the conductive layer;
a second input terminal, configured to receive a second signal; and
an output terminal, wherein a first capacitance is formed between the output terminal and the first input terminal;
wherein a first phase of the first signal is inverse to a second phase of the second signal;
a fingerprint determining module, coupled to the plurality of fingerprint detecting circuit, configured to determine whether each fingerprint detecting circuit corresponds to a finger ridge or a finger valley.

The embodiments of present invention utilize the two signals with the inverse phases to drive the fingerprint detecting circuit, so as to enhance the strength of the output signal and lower the hardness of fingerprint detecting. The power consumption and production cost are reduced, and the requirement of conventional voltage for the portable electronic device are satisfied.

These and other objectives of the present invention will no doubt become obvious to those of ordinary skill in the art after reading the following detailed description of the preferred embodiment that is illustrated in the various figures and drawings.

DETAILED DESCRIPTION

In order to make the objects, technical solutions and advantages of the present invention become more apparent, the following relies on the accompanying drawings and embodiments to describe the present invention in further detail. It should be understood that the specific embodiments described herein are only for explaining the present invention and are not intended to limit the present invention.

Figure 1:
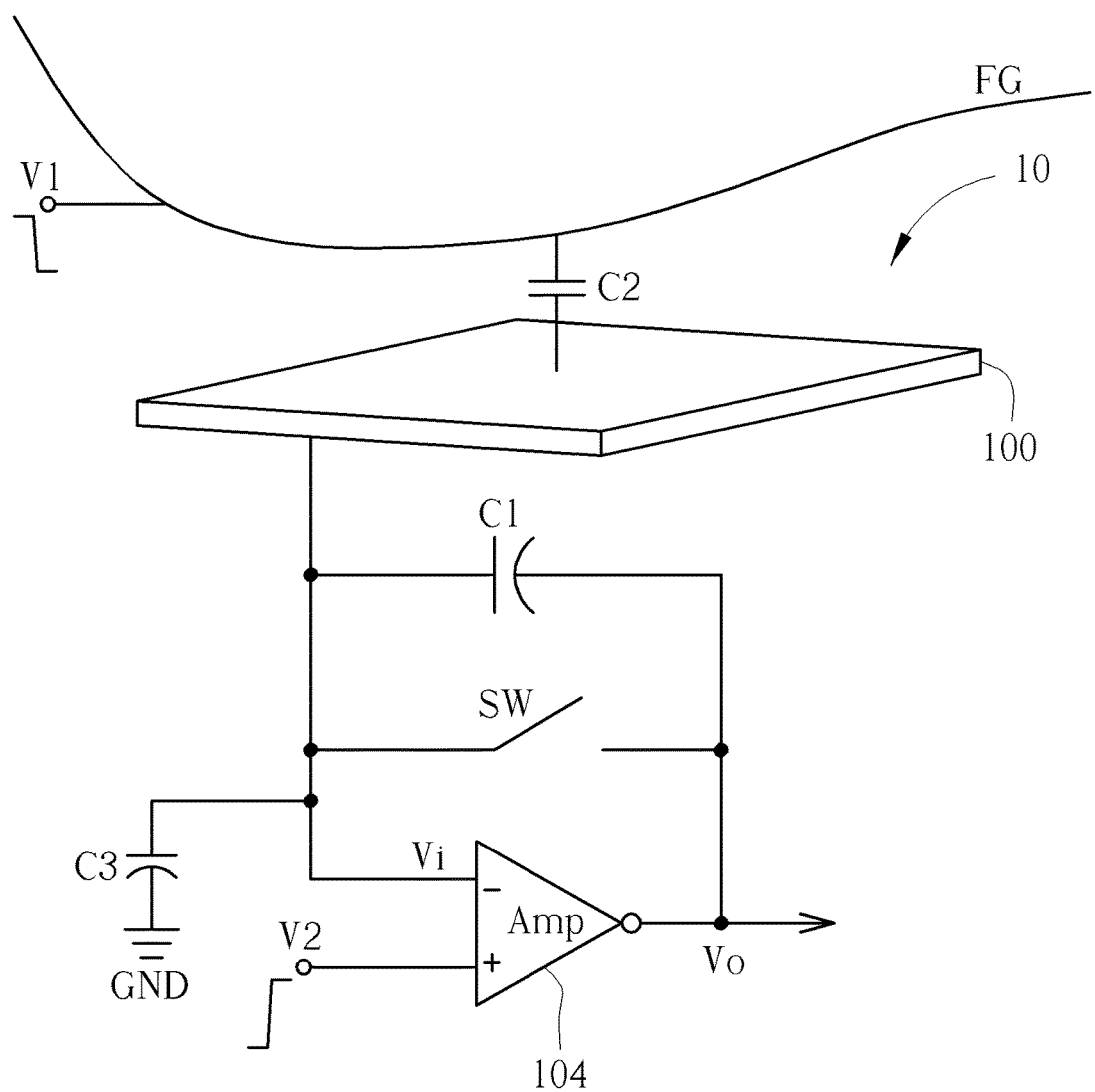
FIG. 1 is a schematic diagram of a fingerprint detecting circuit provided by a first embodiment of the present invention.

As shown in FIG. 1, which is a schematic diagram of a fingerprint detecting circuit 10 provided by a first embodiment of the present invention. The fingerprint detecting circuit 10 is applied in a fingerprint identification system; the fingerprint identification system may generate a first signal V1 and transmit the first signal V1 to a finger FG through a metal electrode.

The fingerprint detecting circuit 10 comprises a conductive layer 100, an amplifier Amp and a switching unit SW. The conductive layer 100 is a top conductive layer, which may be a metal electrode or a metal layer within an integrated circuit (IC) layout. The conductive layer 100 is configured to couple a touch from the finger FG, to form a capacitance C2 between with the finger FG and the conductive layer 100. The amplifier Amp is an operational amplifier, which comprises a negative input terminal (denoted as "−"), a positive input terminal (denoted as "+") and an output terminal. The negative input terminal is coupled to the conductive layer 100, the positive input terminal receives a second signal V2, and the output terminal outputs an output signal Vo. The switching unit SW is coupled between the negative input terminal and the output terminal of the amplifier Amp. In addition, a phase (i.e., a second phase) of the second signal V2 and a phase (i.e., a first phase) of the first signal V1 are inverse to each other. That is, the second signal V2 may be represented as V2=−k*V1, where k represents any positive constant. A capacitance C1 is formed between the output terminal and the negative input terminal (or the conductive layer 100) of the amplifier Amp. The capacitance C1 may be a PIP (Polysilicon-insulator-Polysilicon) capacitance or an MiM (Metal-insulator-Metal) capacitance formed between the output terminal of the amplifier Amp and the conductive layer 100, or a capacitor electrically connected between the output terminal of the amplifier Amp and the conductive layer 100. The capacitance C1 may be regarded as a feedback capacitance of the amplifier Amp. In addition, a capacitance C3 is formed between the conductive layer 100 and a signal ground terminal GND.

In practice, the conductive layer 100 is usually covered by an insulating medium (not illustrated in FIG. 1), where the insulating medium may be a cover plate or a passivation layer. When the insulating medium is thicker and a dielectric constant of the insulating medium is smaller, the capacitance C2 is smaller, such that a voltage amplitude of the output signal Vo is smaller. To solve the problem of small output signal Vo, the fingerprint detecting circuit 10 applies the second signal V2 (which has an inverse phase compared to the first signal V1) to the positive input terminal of the amplifier Amp, such that the voltage amplitude of the output signal Vo is therefore enhanced.

Operational principles of the fingerprint detecting circuit 10 are described as follows:

Since the first signal V1 is coupled to the negative input terminal of the amplifier Amp through the capacitance C2, the amplifier Amp may generate a first output signal Vo1 corresponding to the first signal V1, where the first output signal Vo1 may be expressed as Vo1=−(C2/C1)*V1. Meanwhile, since the positive input terminal of the amplifier Amp receives the second signal V2, the amplifier Amp may also generate a second output signal Vo2 corresponding to the second signal V2, where the second output signal Vo2 may be expressed as Vo2=((C1+C2+C3)/C1)*V2. Therefore, the output signal Vo of the amplifier Amp is a summation of the first output signal Vo1 and the second output signal Vo2. In other words, the output signal Vo may be expressed as:

$$Vo=Vo1+Vo2=-(C2/C1)*V1+((C1+C2+C3)/C1)*V2 \quad \text{(eqn. 1)}.$$

Notably, since the second signal V2 and the first signal V1 have phases which are inverse to each other (i.e., the second signal V2 may be expressed as V2=−k*V1, where k represents any positive constant). As can be seen from eqn. 1, the output signal Vo may further expressed as:

$$Vo=-(C2/C1+k(C1+C2+C3)/C1)*V1 \quad \text{(eqn. 2)}.$$

As can be seen from eqn. 2, a signal strength of the output signal Vo is enhanced by applying the second signal V2 which is inverse to the first signal V1.

For example, under a condition that the capacitance C1 is 100 femto-farad (fF), the capacitance C3 is 10 fF and the capacitance C2 is 20 fF, in order to achieve the output signal Vo with the voltage amplitude as 3V, it is sufficient that the voltage amplitudes of the first signal V1 and the second signal V2 are only 2V. Note that both of the voltage amplitudes of the first signal V1 and the second signal V2 would meet the requirement of the conventional voltage for the portable electronic device. Furthermore, even if the capacitance C2 is decreased, e.g., the capacitance C2 is decreased to 10 fF, when the insulating medium covering the conductive layer 100 is thicker or the insulating medium with smaller dielectric constant is chosen, the voltage amplitude of the output signal Vo still achieves 3V given that the voltage amplitude of the first signal V1 is 3V and the voltage amplitude of the second signal V2 is 2.25V, where the voltage amplitudes of both the first signal V1 and the second signal V2 still meet the requirement of the conventional voltage for the portable electronic device.

In comparison, in the prior art, the positive input terminal of the amplifier is connected to ground (i.e., the second signal V2 is 0V). Under the condition that the capacitance C1 is 100 fF, the capacitance C3 is 10 fF and the capacitance C2 is 20 fF, in order to achieve the voltage amplitude of the output signal Vo to be 3V, the voltage amplitude of the first signal V1 has to be 15V. When the insulating medium covering the conductive layer 100 is thicker or the insulating medium with smaller dielectric constant is chosen such that the capacitance C2 is decreased to 10 fF, the voltage amplitudes of the first signal V1 has to be further enlarged to be 30V, to ensure the voltage amplitude of the output signal Vo to be 3V. In such a condition, supposed that the power supply only provides 3V voltage, an extra boost converter circuit is required to provide the sufficient voltage amplitude of the first signal V1, so as to achieve the voltage amplitude of the output signal Vo to be 3V. Hence, power consumption and production cost are raised.

As can be seen, the fingerprint detecting circuit 10 as the embodiment of the present invention utilizes the first signal V1 and the second signal V2 with the inverse phases to enhance the strength of the output signal Vo, and difficulty of fingerprint detecting is lowered, where the second signal V2 is applied to the positive input terminal of the amplifier Amp. Therefore, the voltage amplitudes of the first signal V1 and the second signal V2 both meet the requirement of conventional voltage for the portable electronic device, and power consumption and production cost are reduced accordingly.

Notably, the embodiments stated in the above are utilized for illustrating the concept of the present invention. Those skilled in the art may make modifications and alterations accordingly, and not limited herein. For example, in the fingerprint detecting circuit 10, the first signal V1 is coupled to the negative input terminal of the amplifier Amp, and the second signal V2 is applied to the positive input terminal of the amplifier Amp, which is not limited thereto. For example, the first signal V1 may be coupled to the positive input terminal of the amplifier, and the second signal V2 may be applied to the negative input terminal of the amplifier, which is also within the scope of the present invention. Notably, when the first signal V1 is coupled to the positive input terminal of the amplifier and the second signal V2 is applied to the negative input terminal of the amplifier, the connections of the switching unit SW and the capacitance C1 should be varied accordingly, which is known by those skilled in the art and not narrated herein.

Figure 2:
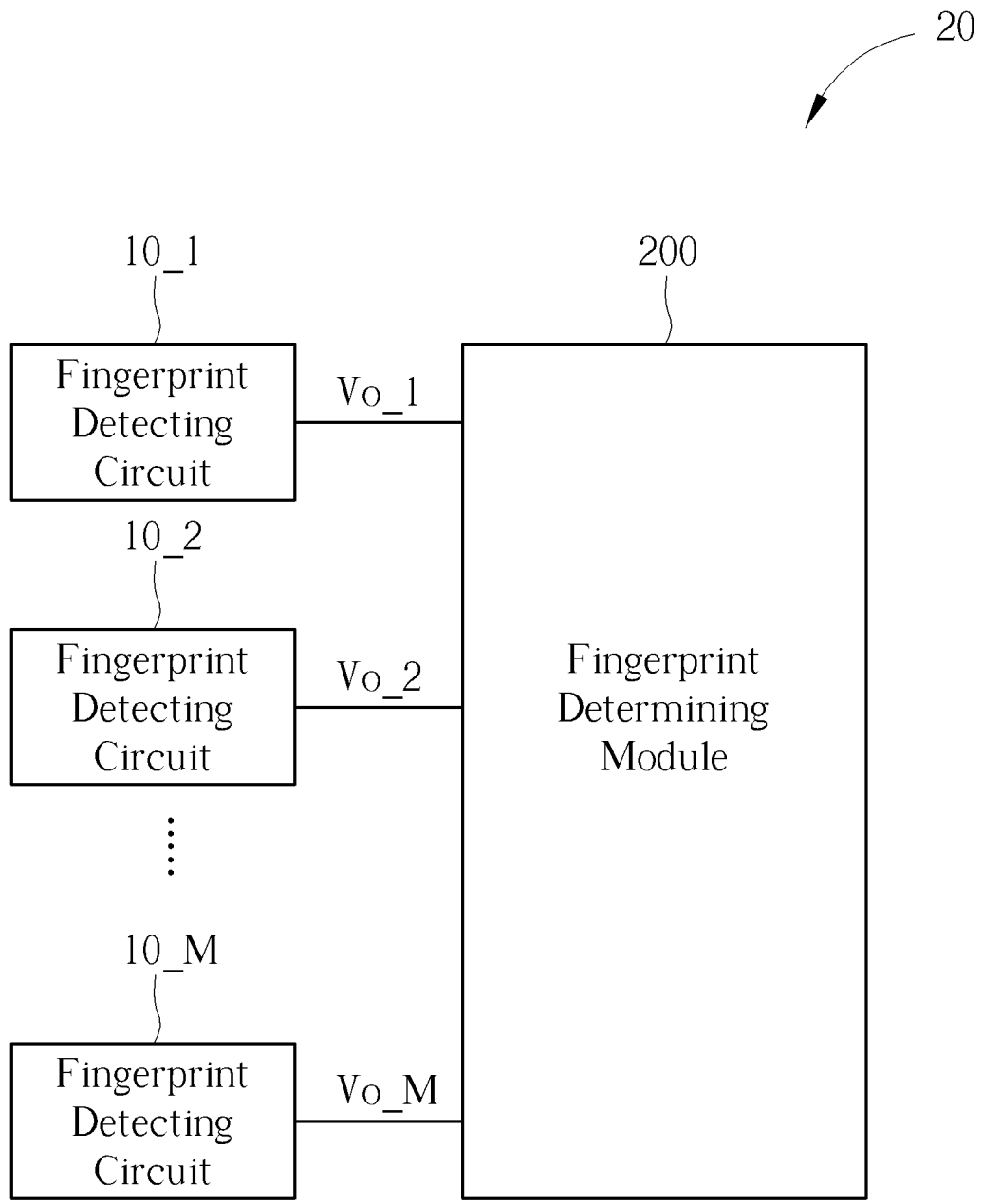
FIG. 2 is a schematic diagram of a fingerprint identification system provided by a second embodiment of the present invention.

In addition, the fingerprint detecting circuit 10 is applied to a fingerprint identification system. As can be seen from FIG. 2, FIG. 2 is a schematic diagram of a fingerprint identification system 20 provided by a second embodiment of the present invention. The fingerprint identification system 20 comprises a fingerprint determining module 200 and fingerprint detecting circuits 10_1 to 10_M. The circuit structure of the fingerprint detecting circuits 10_1 to 10_M are the same as which of the fingerprint detecting circuit 10, which not narrated herein. The fingerprint detecting circuits 10_1 to 10_M are coupled to the fingerprint determining module 200, and deliver output signals Vo_1-Vo_M thereof to the fingerprint determining module 200. The fingerprint determining module 200 may determine whether locations of the fingerprint detecting circuits 10_1 to 10_M correspond to finger ridges or finger valleys of finger.

In summary, the present invention utilizes the two signals with the inverse phases to drive the fingerprint detecting circuit, so as to enhance the strength of the output signal and lower the hardness of fingerprint detecting. The power consumption and production cost are reduced, and the requirement of conventional voltage for the portable electronic device are satisfied.

The foregoing is only preferred embodiments of the present invention, it is not intended to limit the present invention, any modifications within the spirit and principles of the present invention made, equivalent replacement and improvement, etc., should be included in this within the scope of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fingerprint detecting circuit, applied in a fingerprint identification system transmitting a first signal to a finger, the fingerprint detecting circuit comprising:
   a conductive layer, configured to couple a touch from the finger; and
   an amplifier, comprising:
      a negative input terminal, coupled to the conductive layer;
      a positive input terminal, configured to receive a second signal; and
      an output terminal, wherein a first capacitance is formed between the output terminal and the negative input terminal;
   wherein a first phase of the first signal is inverse to a second phase of the second signal.

2. The fingerprint detecting circuit of claim 1, wherein a second capacitance is formed between the conductive layer and the finger, and a third capacitance is formed between the conductive layer and a ground terminal.

3. The fingerprint detecting circuit of claim 2, wherein the first signal is coupled to the negative input terminal through the second capacitance.

4. The fingerprint detecting circuit of claim 1, further comprising a switching unit, configured to establish a direct current (DC) bias of the amplifier, a terminal of the switching unit is coupled to the negative input terminal, and another terminal of the switching unit is coupled to the output terminal of the amplifier.

5. A fingerprint identification system, which transmits a first signal to a finger, the fingerprint identification system comprising:
   a plurality of fingerprint detecting circuits, each fingerprint detecting circuit comprising:
      a conductive layer, configured to couple a touch from the finger; and
      an amplifier, comprising:
         a negative input terminal, coupled to the conductive layer;
         a positive input terminal, configured to receive a second signal; and
         an output terminal, wherein a first capacitance is formed between the output terminal and the negative input terminal;
      wherein a first phase of the first signal is inverse to a second phase of the second signal;
   a fingerprint determining module, coupled to the plurality of fingerprint detecting circuits, configured to determine whether each fingerprint detecting circuit corresponds to a finger ridge or a finger valley.

6. The fingerprint identification system of claim 5, wherein a second capacitance is formed between the conductive layer and the finger, and a third capacitance is formed between the conductive layer and a ground terminal.

7. The fingerprint identification system of claim 6, wherein the first signal is coupled to the negative input terminal of the amplifier through the second capacitance.

8. The fingerprint identification system of claim 5, further comprising a switching unit, configured to establish a direct current (DC) bias of the amplifier, a terminal of the switching unit is coupled to the negative input terminal of the amplifier, and another terminal of the switching unit is coupled to the output terminal of the amplifier.

9. A fingerprint detecting circuit, comprising:
   a conductive layer; and
   an amplifier, comprising a negative input terminal, a positive input terminal and an output terminal;
   wherein the negative input terminal is coupled to the conductive layer, and a first capacitance is formed between the negative input terminal and the output terminal;
   the conductive layer is configured for forming a second capacitance with a finger, and the second capacitance is configured to couple a first signal transmitted to the finger to the negative input terminal;

the positive input terminal is configured to receiving a second signal which has a phase inverse to that of the first signal.

10. The fingerprint detecting circuit of claim 9, wherein the first signal and the second signal cooperate with each other to drive the fingerprint detecting circuit to operation.

11. The fingerprint detecting circuit of claim 10, wherein the second signal are expressed as:

$$V2=-k*V1,$$

wherein V1 represents the first signal, V2 represents the second signal, and k is a positive constant.

12. The fingerprint detecting circuit of claim 9, wherein the first capacitance serves as a feedback capacitance of the amplifier, and is a PIP capacitance or an MiM capacitance formed between the output terminal of the amplifier and the conductive layer.

13. The fingerprint detecting circuit of claim 9, wherein a third capacitance is formed between the conductive layer and a ground terminal.

14. The fingerprint detecting circuit of claim 13, wherein the amplifier is configured to generate a first output signal corresponding to the first signal, and generate a second output signal corresponding to the second signal; wherein an overall output signal of the output terminal of the amplifier is a summation of the first output signal and the second output signal.

15. The fingerprint detecting circuit of claim 14, wherein the first output signal, the second output signal, and the overall output signal are respectively expressed as:

$$Vo1=-(C2/C1)*V1;$$

$$Vo2=((C1+C2+C3)/C1)*V2;$$

$$Vo=-(C2/C1+k(C1+C2+C3)/C1)*V1;$$

wherein Vo1 and Vo2 represent the first output signal and the second output signal respectively; Vo represents the overall output signal of the output terminal; V1 and V2 represent the first signal and the second signal respectively; C1, C2 and C3 represent the first capacitance, the second capacitance and the third capacitance; and k is a positive constant.

16. The fingerprint detecting circuit of claim 9, further comprising a switching unit, configured to establish a direct current (DC) bias of the amplifier, a terminal of the switching unit is coupled to the negative input terminal, and another terminal of the switching unit is coupled to the output terminal of the amplifier.

* * * * *